June 25, 1968 A. L. HITCHENS 3,389,748
CELLULAR CORE INCLUDING PERIMETER PASSAGEWAY MEANS
Filed June 28, 1966 2 Sheets-Sheet 1
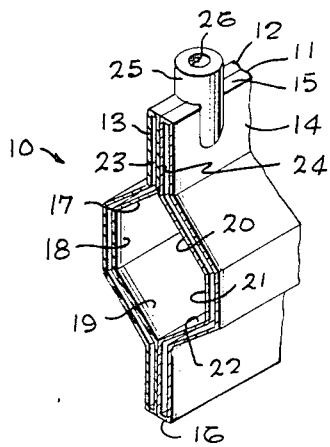
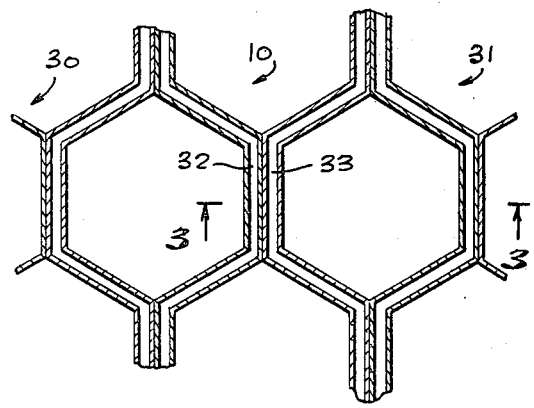
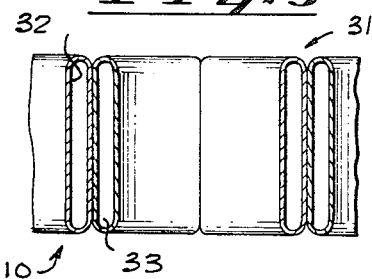
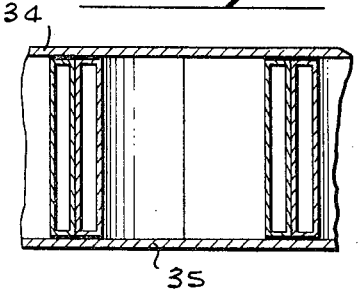
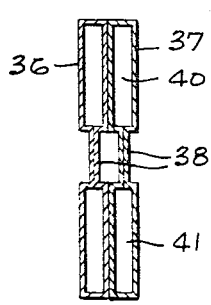
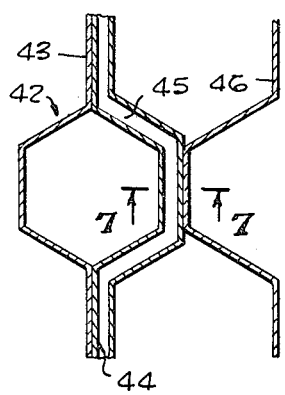
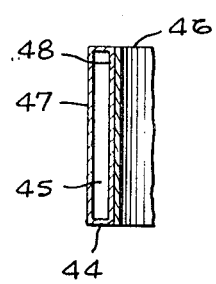
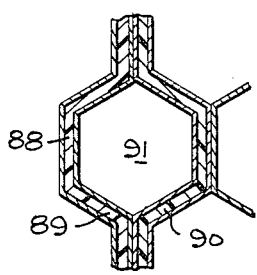
AARON L. HITCHENS
INVENTOR.
BY R. E. Jeangue
ATTORNEY

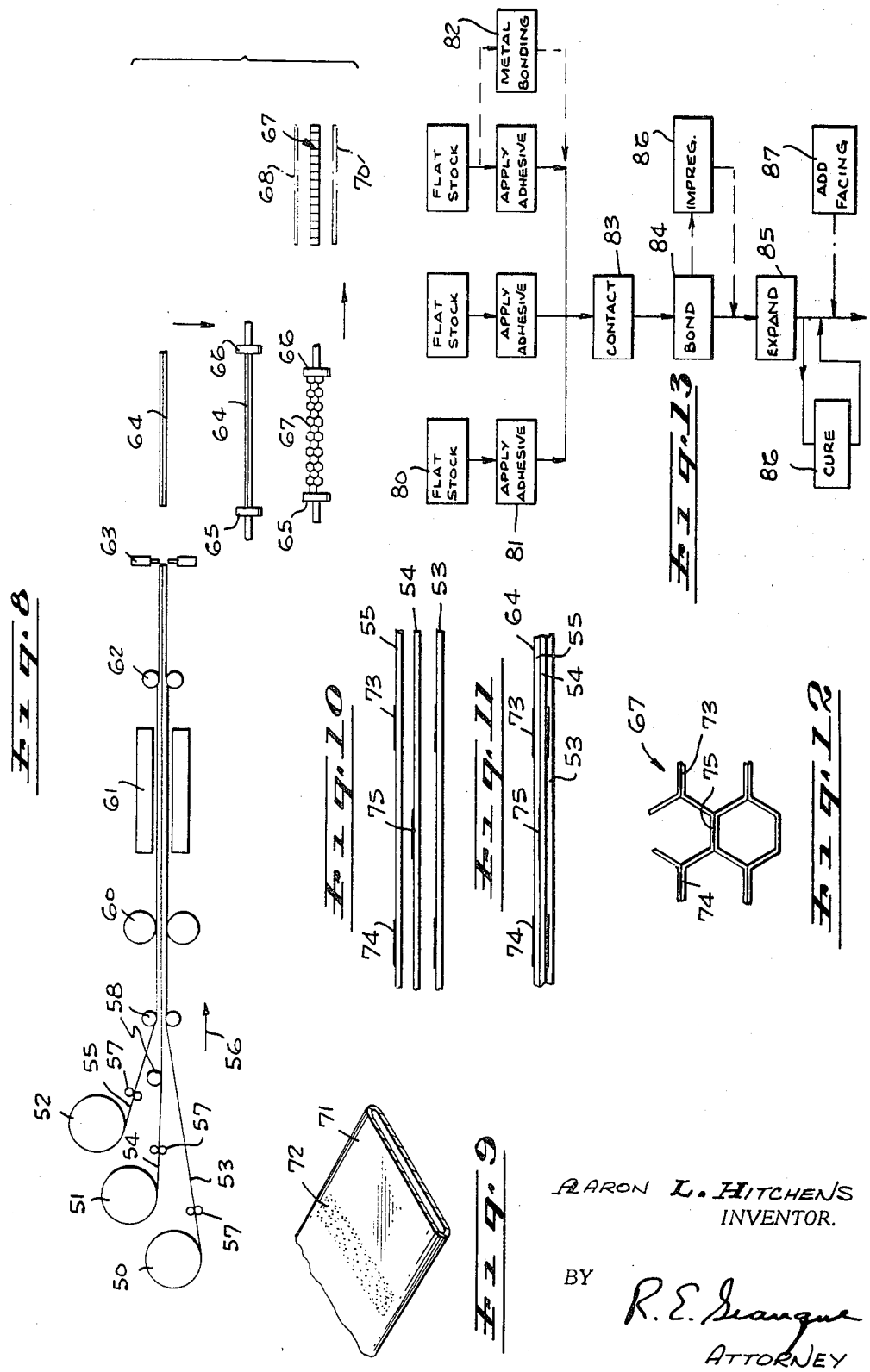

United States Patent Office 3,389,748
Patented June 25, 1968

3,389,748
CELLULAR CORE INCLUDING PERIMETER
PASSAGEWAY MEANS
Aaron L. Hitchens, P.O. Box 456,
Northridge, Calif. 91324
Filed June 28, 1966, Ser. No. 561,093
6 Claims. (Cl. 165—170)

ABSTRACT OF THE DISCLOSURE

A plurality of hollow strips are secured together and are formed into closed cells by displacing each strip on each side of a median plane. Each closed cell is bounded on its perimeter by passageways which are adapted to convey a fluid as in a heat exchanger or to have a temperature reacting plastic therein as in a structural support.

---

This invention relates to an improved honeycomb structure and more particularly to a novel honeycomb structure having the cellular defining walls thereof adapted to serve as fluid passageways. Also, the present invention relates to a novel method for fabricating honeycomb cellular structures incorporating a continuous process whereby the structure may be fabricated to desired lengths and cellular density.

Hexagonal cellular honeycomb structures are well known for their high strength-to-weight ratio and such structures have been employed for various applications in many fields such as in the aircraft and architectural industries. Conventional cellular type honeycomb structures are formed from suitable core material in which relatively dense high-strength material strips or sheets are arranged to form hexagonal shaped cells in which the full strength of the wall defining the cells are utilized to produce tensile and compressive strength in the direction of the cell axis by the provision of double and single ply wall formation in a structure characterized by having an extremely low specific gravity. In the production of structural honeycomb materials, layers of the strips or sheets are secured together in a staggered fashion in the form of a stack so that the stack may be expanded into the cellular space. Normally, expansion is effected laterally by pulling the opposite outermost layers of the stacked sheet material away from each other so that the individual cells are formed as the multiple layers are separated.

However, conventional honeycomb cellular structures are composed of a multiplicity of isolated cells making it impossible to circulate a fluid throughout the structure. Although previous attempts have been made to intercommunicate the cells by employing small apertures in the walls defining adjacent cells, these attempts have been found to be unsatisfactory because the walls are weakened and hence the overall strength of the structure adversely affected. Also, by employing conventional fabrication techniques, cellular construction having shapes different than hexagonal are difficult to achieve and generally involve complex and expensive equipment as well as involved procedures.

Furthermore, by exerting lateral separation or pulling apart of the layers of sheet materials to expand the cells, great separating force is applied to the staggered bonded or secured areas resulting in the layers of sheet material becoming unsecured during the expansion procedure. This, of course, is quite detrimental to the formation of a plurality of individually shaped cells and to the structural integrity of the expanded sheet material.

To obviate the difficulties and problems encountered with conventional honeycomb cellular structures and the methods of fabrication thereof, the novel structure and method of the present invention incorporates the use of flat tubular material that is initially stacked in layers wherein the layers are adhesively or metal bonded together in a staggered or spaced apart relationship so that upon expansion of the layers, each cell is defined by an enclosed fluid passageway. In this fashion, a separate and continuous passageway not only surrounds each cell but intercommunicates the multiplicity of cells so that free fluid flow exists throughout the entire structure. Furthermore, by employing flat tubular material, a variety of cellular construction can be fabricated such that a selected number of double-wall fluid passageways can be included with single wall sheeting if desired. Also, the tubular material may be collapsed at strategic locations to provide several fluid passageways formed in one sheet of material. Several sheets formed with multiple passageway may be readily fitted together to provide a honeycomb structure wherein each passageway represents a cell. In this latter instance, the individual cells would be isolated from each other and a variety of cell shapes can be accommodated.

Therefore, it is a primary object of the present invention to provide a novel honeycomb cellular structure incorporating tubular material so that each cell of the structure may be surrounded by a continuous fluid passageway.

Another object of the present invention is to provide a novel honeycomb cellular structure incorporating a plurality of flat tubular material sheets which are secured together in a staggered fashion so that upon expansion of the sheet, a plurality of isolated cells are formed that are surrounded by a continuous fluid passageway network.

Another object of the present invention is to provide a novel honeycomb cellular structure and method of fabrication therefore that permits fluid passageways to be formed in the structure adjacent selected cells in the structure when the structure is expanded.

Still another object of the present invention is to provide a novel honeycomb cellular structure and method of fabrication therefor which permits the cells of the structure to be shaped as desired to any particular configuration by employing a plurality of flat tubular sheet material that is initially preformed to provide a plurality of cells from each tubular sheet and then securing the plurality of tubular sheets together so that the desired arrangement of cellular construction is achieved.

Still a further object of the present invention is to provide a novel method and process for fabricating honeycomb cellular structures whereby the material will be expanded evenly and wherein the secured areas of adjacent layers of material will not be inadvertently separated during the expansion procedure.

Other features and objects of the invention will be found throughout the more detailed description of the invention which follows. Those novel features believed to be descriptive of the nature of the invention are described with particularity in the appended claims. To more clearly portray the invention and its manner of operation, the description is supplemented with the accompanying drawings in which:

FIGURE 1 is a perspective view of a cell incorporated in the novel honeycomb structure of the present invention;

FIGURE 2 is an enlarged fragmentary view, in section, of the novel honeycomb structure and FIGURE 2a is a similar view showing a modification;

FIGURE 3 is a sectional view of the honeycomb structure as taken in the direction of arrows 3—3 of FIGURE 2;

FIGURE 4 is a sectional view of the modified honeycomb structure including skins or facings secured to opposite sides of the structure to provide a bonded honeycomb sandwich panel;

FIGURE 5 is a cross-sectional view of another modification of the honeycomb structure;

FIGURE 6 is a cross-sectional view of still another modification of the honeycomb structure;

FIGURE 7 is a fragmentary view, in section, of the honeycomb structure modification illustrated in FIGURE 6 as taken in the direction of arrow 7—7 thereof;

FIGURE 8 is a diagrammatic illustration showing the fabrication sequence for producing the novel honeycomb structure of the present invention;

FIGURE 9 is an enlarged perspective view of tubular stock material employed in the honeycomb structure fabrication process illustrating the stock material after application of adhesive thereto;

FIGURE 10 is a diagrammatic illustration of three sheets of tubular stock material having adhesive applied thereto prior to being pressed together;

FIGURE 11 is a diagrammatic illustration of tubular stock material after adhesive adhering and pressing;

FIGURE 12 is a diagrammatic illustration of the pressed together stock material after being expanded to form the novel honeycomb structure; and FIGURE 13 is a block diagram illustrating the fabrication steps of the present invention for producing the novel honeycomb structure of FIGURE 12.

Referring to FIGURE 1, a single honeycomb cell incorporating the present invention is illustrated in the general direction of arrow 10 which is formed from a pair of flat tubular sheets 11 and 12, respectively. Prior to forming, each sheet comprises two parallel and spaced-apart flat sides 13 and 14 that are united at their opposite ends by sections 15 and 16, respectively. Hence, hollow tubular sheets are employed which, when formed into the hexagon configuration as shown in FIGURE 1, provide a closed cell defined by inner side walls 17, 18 and 19 associated with sheet 12 and opposing inner side walls 20, 21 and 22 associated with sheet 11. The end portion of the sheet 11 and 12 projecting outwardly from the opposite ends of the cell are secured in face-to-face abutment with each other and are joined together by a suitable adhesive or bond. Thereby, a hexagonal shaped cell is formed that is completely encircled by a pair of fluid passageways such as indicated by numeral 23 and 24, respectively.

In the event that it is desired to interconnect the passageways or to provide a means of conducting the passageways externally of the structure, a tubular element 25 may be employed that is secured to the abutting end portion of the sheet and which includes a passageway 26 that communicates with either one or both passageways 23 and 24. In this fashion, the passageways may be employed for conducting a suitable recirculating coolant or agent such as water in a radiator system.

Although a single cell is illustrated in FIGURE 1, it is to be noted with respect to FIGURE 2 that additional cells may be included so that an overall honeycomb structure results. As illustrated, the single honeycomb cell 10 is disposed between an identical cell 30 and 31. The outer sides of adjacent sheets defining the individual cells are arranged in abutting face-to-face relationship and are joined together by any suitable metal, adhesive, or bonding means. By such an arrangement, the abutting sides or walls of the adjacent cells provide a double passageway through which a desired fluid may be circulated. As illustrated, fluid passageway 32 is associated with cell 10 and fluid passageway 33 is associated with cell 31 and the passageways are separated by a double wall thickness. This relationship may be repeated throughout the honeycomb structure.

Referring now to FIGURE 3, a cross-sectional view is illustrated which shows passageways 32 and 33 defined by the adjacent flat hollow sheet which define the honeycomb cell.

Referring now to FIGURE 4, a modification of the honeycomb structure illustrated in FIGURES 2 and 3 is shown whereby the honeycomb structure representing a plurality of hexagonal cells defined by the formed flat hollow sheets is disposed between facing 34 and 35 so that a composite honeycomb sandwich panel results. The facings 34 and 35 may be suitably secured to the honeycomb core by any suitable means such as gluing, soldering, or welding as desired.

Referring to FIGURE 5, another modification of the present invention is shown whereby the flat, hollow sheets may be formed by urging portions of the sheet together so that their opposite walls abut whereby a plurality of fluid passageways can be formed. As illustrated, flat hollow sheets 36 and 37 have been formed midway between their opposite ends so that the outer side walls are compressed together at mid-section 38 so that each sheet is formed with a pair of fluid passageways as represented by numerals 40 and 41 with respect to sheet 37. After each sheet has been formed into the configuration of sheet 37, the plurality of sheets may be joined together such as sheets 36 and 37 in a symmetrical relationship or, if desired, the formed sheets may be arranged in such a manner that the fluid passageway defined by the modified walls of one sheet can be placed against the mid-section 38 of an adjacent sheet so that a staggered asymmetrical arrangement of fluid passageways is provided.

Referring now to FIGURE 6, another modification of the present invention is shown whereby a hexagon cell 42 is provided from a sheet 43 which represents a flat single walled member in combination with a formed hollow, flat tubular sheet 44 so that a continued fluid passageway 45 is provided which extends along only one side of the cell. By bonding or otherwise securing to the outer surface of the sheet 44, a single sheet of formed material 46 may be joined to the sheet 44.

FIGURE 7 more clearly illustrates the fluid passageway 45 defined by the sides 47 and 48 of the sheet 44. The outer surface of the sheet 48 is secured to a portion of the single sheet 46. Thereby, a single fluid passageway is provided for extending throughout a honeycomb cellular structure between adjacent cells of the structure.

In accordance with the present invention, a novel method of involving a continuous process of fabricating honeycomb core structures is diagrammatically illustrated which is based upon a procedure of coating or applying bonding agents at appropriate intervals along one side of a plurality of sheets or strips of core material. The stock material may take the form of metal, paper, or the like. The material employed may be either a flat hollow strip, such as previously described, or a single thickness layer strip. In the event flattened hollow or tubular strips are employed, these may be expanded by subsequent inflation after fabrication, if desired, to form the hollow core honeycomb structure having fluid passageways such as is illustrated with respect to FIGURES 1–7 inclusive.

The stock materials having the bonding agent applied on one side thereof are forcibly pressed together in the form of sandwiched layers whereby adjacent sheet or strip material is urged into contact with respective bonding agent portions of each adjacent strip. Curing of the bonding agent occurs at the location of the bonding agent by subjecting the sandwiched layers to a heat curing stage, after which the sandwiched layers may be cut to desired length and expanded into a honeycomb structure.

When metal strips are employed, the bonding may take the form of pre-soldered areas or areas which are pre-tinned so that proper metal bonding can be achieved by soldering technique. Also, high temperature resistance organic adhesives may be employed so that bonding results from subsequent heat and pressure. In the case of paper or paper-like material, non-tacky heat sealing adhesive may be applied to the stock material so that bonding occurs by subsequent heat and pressure. Also, wet adhesive may be employed by applying such adhesives immediately prior to the initial step of pressing the plurality of strips together into a sandwiched layer. Also, paper material formed by the present process may be expanded, introduced to an impregnating phenolic solution and then heat cured so that the resultant structure is provided with strength and rigidity. The paper may also be pre-impregnated prior to bonding, if desired. After the honeycomb core has been fabricated, facings may be applied to the opposite sides of the structure and the step of securing the facings may be included in the continuous process of the present invention.

Referring now to FIGURE 8, a typical process illustrating the method of the present invention is illustrated whereby the stock material to be sandwiched together to form a honeycomb structure is initially stored in rolls such as rolls 50-52 inclusive that are employed for supplying material 53-55 inclusive in either sheets or strips. Each sheet or strip of stock material is processed in the general direction of arrow 56 by means of process rollers such as is indicated by numeral 58. The sheet material is first introduced to a roller, such as roller 57 having suitable adhesive selectively about its periphery so that adhesive composition is selectively applied to one side of the sheet or strip materials 53-55 at spaced intervals. The rollers 58 are employed for moving the stock material in the general direction of arrow 56 and are arranged strategically so as not to engage the selected surface areas of the stock material on which the adhesive has been pre-applied by the rollers 57.

After the stock material has been substantially oriented in fixed spaced parallel relationship by the rollers 58, the sheets are fed to a pressing unit represented by rollers 60 which serve to force the stock material sheets into a sandwiched layer so that the adhesive previously applied to selected areas of the stock material will come into contact with selected areas of adjacent stock material. Next, the sandwiched layers are introduced to a heating unit represented by numeral 61 by which the adhesive is cured so that an effective bond results, which joins the adjacent sheets of stock material to form a unitary structure. Upon further processing from the curing oven or other suitable curing means, the sandwiched layer is introduced to or between a pair of pressing rollers 62 which further urges the sandwich construction into unitary conformity and effect uniform compressibility within the stock material so that the sandwich layer displays prescribed and desirable characteristics. Subsequent to the pressing of the sandwich layer by the rollers 62, the stock material is introduced to a cutter represented by numeral 63 whereby prescribed lengths or dimensions of sandwiched layer may be cut from the continuous stock material to provide a panel 64.

In the event it is desired to expand panel 64 into a honeycomb structure, the panel 64 may be readily disposed between a pair of hydraulic rams 65 and 66 respectively so that when the rams are forced against the opposite ends of the panel 64, sufficient force is transmitted through the various sheets or layers of the panel to expand the panel 64 in a direction normal to the applied force supplied by the rams 65 and 66. The stock material forming the layers of the panel 64 will be urged outwardly in this direction and uniformity of cellular construction will be retained due to the adhesive or metal bonding of the plurality of sheets or strips.

After the panel has been expanded into a honeycomb structure represented by the numeral 67, the structure can be removed from between the rams 65 and 66 and, if desired, panels or facings 68 and 70 may be suitably secured to opposite sides of the expanded honeycomb 67.

FIGURE 9 illustrates a strip of hollow stock material 71 which is similar to the flat hollow material previously described. It is to be particularly noted that one planar surface of the stock material 71 is provided with a suitable adhesive coating such as is indicated by numeral 72. It is to be noted that the adhesive coating is applied between the opposite sides of the material 71 to form a thin band across the width thereof so that the adhesive is in preselected locations for strategically engaging with an adjacent surface of another sheet or strip of similar material.

Referring now to FIGURES 10-12 inclusive, the various steps of the continuous process illustrated in FIGURE 8 are shown schematically in detail wherein FIGURE 10 illustrates the selective location of adhesive areas on each strip so that the adhesive areas are staggered at predetermined intervals with respect to adjacent sheets or strips of material. For example, adhesive coating 73 is arranged in spaced apart relationship with respect to adhesive coating 74 on the same stock material while adhesive coating 75 is strategically disposed midway between adhesive coating area 73 and 74 on the adjacent side of another sheet or strip of stock material. Therefore, when the material is arranged in a sandwich construction such as is illustrated in FIGURE 11, certain selected areas of adjacent stock materials will be bonded together after suitable application of pressure and curing procedures which will effectively result in the panel 64. FIGURE 12 illustrates the sandwich panel 64 after expansion into the honeycomb structure 67. It is to be particularly noted that the adjacent sheets of stock material in the sandwich construction 64 are held together by the bonded areas such as 74, 73 and 75 and that a plurality of hexagonal wall defining cells are effected.

Referring now to FIGURE 13, the basic step, including alternate and optional processing steps are illustrated whereby flat stock 80 is operated upon in a continuous process by initially applying adhesive or metal bonding means 81 and 82 respectively and by contacting 83 the plurality of stock sheet or strip materials together by pressing the plurality of stock material together. After the stock materials have been contacted so that the adhesive or metal bonding agents operate to join adjacent stock materials, the assembly is introduced to a curing procedure 84 which effects the bond of the adjacent materials at selected intervals after which, the sandwich layer can be expanded 85 as desired. To achieve expansion, the panel may be either subjected to a mechanical compressive force or, if desired, a fluid under pressure such as for example, air or water may be introduced through the previously collapsed hollow tubes so that expansion occurs. In the event that the stock material is paper or other porous stock material, the bonded material can be impregnated 86 with any suitable resin or plastic material prior to expansion of the sandwich layer. Also, after the sandwiched layers have been expanded, facings 87 may be added to opposite sides of the expanded material, if desired.

The rigidity or stiffness of the honeycomb core including the completed honeycomb panel with the face sheets attached to both sides of the core can be increased by introducing a suitable filling material into the hollow tubular sheets as indicated in FIGURE 2a. Different filling materials may be used. The selection of material will depend upon the size, shape of core and end use of the completed panel. As an example, a liquid plastic monomer 88 may be used to fill the passageways 89 and 90 about cell 91 of the core. On polymerization additional rigidity is effected. Other materials which display characteristics of concrete may be utilized also. Even further advantages may be obtained by filling the hollow passageways with heat expandable plastic material such as Pelaspan 222S, for example. Initially, the filling material may be bonded or adhesively secured in a thin uniform layer onto the inner surfaces of the passageway walls. After forming the sheets into the honeycomb core, the application of heat thereto will expand the Pelaspan 222S to increase the rigidity of the core.

Unexpanded sheets or strips of material of either hollow or solid characteristics and composed of metal or porous paper-like material herein mentioned may be produced in various shapes and sizes, and other than as flat rectangular pieces of uniform thickness. The present invention may be employed to excellent advantage in the expansion of tapered, curved, and other variously shaped and configured pieces of unexpanded honeycomb and like cellular material, and the term "panel" as used herein and in the claims, include all shapes and forms of cellular material to be expanded.

While the present invention has been shown and described and the fundamental novel features of the invention pointed out as applied to preferred embodiments, it would be understood that various omissions and substitutions and changes in the form and details of the invention may be made by those skilled in the art without departing from the spirit and scope of the invention; therefore, it is intended that the invention be limited only as indicated by the scope of the following claims.

What is claimed is:

1. A cellular core for use in a structural panel comprising:
   a plurality of strips each being configured to form bond areas displaced on each side of a median plane with the intervening areas of said strips forming closed cells;
   each strip of said plurality comprising a flat hollow body providing a passageway substantially about the perimeter of each of said formed closed cells; and
   face sheets separated by and attached to the cellular core and effective to close and seal each of said formed closed cells so that each of said cells is isolated from the other of said cells.

2. A panel structure comprising:
   a pair of reinforcing sheets and a plurality of flat hollow strips interposed edgewise therebetween;
   said strips being corrugated so as to provide abutting contact areas extending generally normal to the plane of said sheets whereby to form a cellular core;
   said strips being bonded to their adjacent strips at said abutting contact areas and to said sheets with a bonding agent to form a unitary structure; and
   said hollow strips defining fluid passageways substantially encircling each cell of said cellular core.

3. The invention as defined in claim 2 including conduit means interconnecting said fluid passageways so as to provide a continuous flow path throughout said cellular core.

4. A sandwich panel structure comprising:
   a plurality of flat strips being corrugated so as to provide abutting contact areas on each side of a median plane with the intervening areas of said strips forming hexagonal cells;
   at least two of said strips of said plurality being employed to define a single cell of said formed hexagonal cells;
   a selected one of said two strips comprising a flat hollow body defining a passageway disposed between adjacent ones of said cells extending in a corrugated path between a plurality of adjacent cells; and
   a filler material deposited within said passageway so as to increase the structural strength of the panel.

5. The invention as defined in claim 4 wherein said filler material is a temperature reacting plastic material adapted to expand upon being subjected to heat to close said passageway and to reinforce said panel.

6. The invention as defined in claim 1 including an expandable filler material carried by said strips within said passageways and being effective to reinforce the cellulare core and to increase the structural strength thereof.

References Cited
UNITED STATES PATENTS

| | | | |
|---|---|---|---|
| 985,687 | 2/1911 | Livingston | 165—152 |
| 1,239,495 | 9/1917 | Livingston | 165—152 |
| 1,400,353 | 12/1921 | Fraidus | 165—152 |
| 2,999,306 | 9/1961 | Baxter | 29—157.3 |
| 3,224,501 | 12/1965 | Burdick et al. | 165—169 XR |
| 3,239,982 | 3/1966 | Nicosia | 52—615 XR |
| 3,298,433 | 1/1967 | Lemelson | 165—168 |

FOREIGN PATENTS

| | | |
|---|---|---|
| 487,447 | 4/1918 | France. |

ROBERT A. O'LEARY, *Primary Examiner.*

M. A. ANTONAKAS, *Assistant Examiner.*